(12) United States Patent
Oommen et al.

(10) Patent No.: US 7,983,226 B2
(45) Date of Patent: Jul. 19, 2011

(54) APPARATUS, AND ASSOCIATED METHOD, FOR RETRIEVING MOBILE-NODE LOGIC TREE INFORMATION

(75) Inventors: Paul Oommen, Irving, TX (US); Gaurav Mittal, San Diego, CA (US)

(73) Assignee: Nokia Corporation, Espoo (FI)

( * ) Notice: Subject to any disclaimer, the term of this patent is extended or adjusted under 35 U.S.C. 154(b) by 1903 days.

(21) Appl. No.: 10/308,906

(22) Filed: Dec. 3, 2002

(65) Prior Publication Data

US 2003/0103484 A1 Jun. 5, 2003

Related U.S. Application Data

(60) Provisional application No. 60/336,879, filed on Dec. 3, 2001, provisional application No. 60/350,669, filed on Jan. 22, 2002, provisional application No. 60/384,517, filed on May 30, 2002.

(51) Int. Cl.
*H04M 3/00* (2006.01)
*H04Q 7/24* (2006.01)
*H04Q 7/20* (2006.01)

(52) U.S. Cl. ......... 370/338; 455/419; 455/418; 455/434

(58) Field of Classification Search ............... 370/338, 370/408, 256, 229, 392.32, 402, 466, 349, 370/238, 252, 253; 455/419, 418, 422.1, 455/420, 434, 408, 519, 518, 433.1
See application file for complete search history.

(56) References Cited

U.S. PATENT DOCUMENTS

| | | | | |
|---|---|---|---|---|
| 5,406,643 A | * | 4/1995 | Burke et al. | 709/243 |
| 5,528,583 A | * | 6/1996 | Acampora et al. | 370/256 |
| 5,530,703 A | * | 6/1996 | Liu et al. | 370/255 |
| 5,566,184 A | | 10/1996 | Ooi | |
| 5,636,216 A | * | 6/1997 | Fox et al. | 370/402 |
| 5,787,080 A | * | 7/1998 | Hulyalkar et al. | 370/310.2 |
| 5,930,264 A | * | 7/1999 | Nguyen | 370/466 |
| 5,940,385 A | * | 8/1999 | Mita et al. | 370/349 |
| 5,953,319 A | * | 9/1999 | Dutta et al. | 370/238 |
| 5,966,649 A | * | 10/1999 | Gulliford et al. | 455/408 |
| 6,137,791 A | | 10/2000 | Frid et al. | |
| 6,176,883 B1 | | 1/2001 | Holloway et al. | |
| 6,195,705 B1 | * | 2/2001 | Leung | 709/245 |

(Continued)

FOREIGN PATENT DOCUMENTS

EP 0957616 11/1999

(Continued)

OTHER PUBLICATIONS

English Translation of Notice of Reasons for Rejection for JP2003-550449 dated Jul. 11, 2006, 5 pages.

(Continued)

*Primary Examiner* — Tilahun Gesesse
(74) *Attorney, Agent, or Firm* — Banner & Witcoff, Ltd.

(57) ABSTRACT

Apparatus, and an associated method, for facilitating exchange of configuration indicia associated with a mobile node operable in a radio communication system. The mobile node is dynamically-configurable, and includes a logic tree. The indicia is provided to a network manager responsive to request therefore or upon initiation by the mobile node. When initiated at the network, a request message generator located at a network manager generates a get message to request that certain configuration indicia be provided to the network manager. The mobile node, upon delivery of the get message thereto, retrieves the requested information, at a selected level of detail, and returns the indicia to the network manager.

47 Claims, 6 Drawing Sheets

U.S. PATENT DOCUMENTS

| | | | |
|---|---|---|---|
| 6,219,703 B1 | 4/2001 | Nguyen et al. | |
| 6,374,112 B1 | 4/2002 | Widegren et al. | 455/452 |
| 6,396,814 B1 * | 5/2002 | Iwamura et al. | 370/256 |
| 6,445,922 B1 | 9/2002 | Hiller et al. | 455/433 |
| 6,466,552 B1 | 10/2002 | Haumont | 370/310 |
| 6,501,741 B1 | 12/2002 | Mikkonen et al. | 370/310 |
| 6,587,685 B2 * | 7/2003 | Mittal et al. | 455/419 |
| 6,643,506 B1 * | 11/2003 | Criss et al. | 455/419 |
| 6,704,319 B1 * | 3/2004 | Durham et al. | 370/408 |
| 6,901,395 B2 * | 5/2005 | Andrus et al. | 707/1 |
| 6,978,453 B2 * | 12/2005 | Rao et al. | 717/171 |
| 7,242,929 B2 * | 7/2007 | Draluk et al. | 455/419 |
| 2002/0114286 A1 * | 8/2002 | Iwamura et al. | 370/252 |
| 2004/0192280 A1 * | 9/2004 | Dalton et al. | 455/418 |

FOREIGN PATENT DOCUMENTS

| | | |
|---|---|---|
| JP | 09167167 | 6/1997 |
| JP | 10334011 | 12/1998 |
| JP | 11134230 | 5/1999 |
| RU | 2122291 | 11/1998 |
| WO | 0180577 | 10/2001 |

OTHER PUBLICATIONS

English Translation of Notice of Reasons for Rejection for JP2003-550449 dated Oct. 25, 2005, 5 pages.

First Office Action for CN02807610.9 dated Dec. 24, 2004 with English Translation, 8 pages.

Examiner's First Report for AU2002359548 dated Feb. 17, 2004, 1 page.

Official Action for RU2003124063/09 with English Translation, 6 pages.

Notice to Submit Response in KR10-2003-7010226 dated Sep. 30, 2005 with English Translation, 5 pages.

Notice of Reasons for Rejection in JP2007-003643 dated Feb. 2, 2010 with English Translation, 9 pages.

SyncML Representation Protocol, Version 1.0.01, SyncML Specification; Version 1.0.1, Jun. 15, 2001, <http://www.openmobilealliance.org/tech/affiliates/SyncML/SyndMLindex.html>, 70 pages.

Memo Concerning the Official Action for Mexican Patent Application No. MX/a/2007/000790, 1 page.

Decision on Grant for RU 2003124063/09 dated Jun. 2, 2005.

SyncML Representation Protocol, Device Management Usage, Version 1.1, SyncML Device Management Specifications, Version 1.1, Feb. 15, 2002, <http://www.openmobilealliance.org/tech/affiliates/SyncML/SyncMLindex.html>.

SyncML Device Information Version 1.0.1-DTD, SyncML Specification; Version 1.0.1, Jun. 15, 2001, <http://www.openmobilealliance.org/tech/affiliates/SyncML/SyncMLindex.html>.

SyncML Device Management Standardised Objects 1.1, SyncML Device management Specifications, Version 1.1, Feb. 15, 2002, <http://www.openmobilealliance.org/tech/affiliates/SyncML/SyncMLindex.html>.

SyncML Device Information DTD 1.0.1 (Jun. 15, 2001).

Singapore Examination Report for SG 200605018-1 dated Aug. 25, 2009.

SyncML Device Management Tree and Description Abstract, <http://www.syncml.org/docs/syncml_dm_tnd_v11_20020215.pdf>, Version 1.1, Feb. 15, 2002, 38 pages.

SyncML Device Management Protocol, <http://www.syncml.org/docs/syncml_dm_protocol_v11_20020215.pdf>, Version 1.1, Feb. 15, 2002, 37 pages.

Office Action for EP 02 794 094.9-1244 dated Jan. 21, 2011.

Supplementary European Search Report for EP 02 79 4094 dated Sep. 24, 2010.

"Digital Cellular Telecommunications System (Phase 2+) (GSM); Universal Mobile Telecommunications System (UMTS); Mobile Station Application Execution Environment (MExE); Functional description; Stage 2 (3G TS 23.057 version 3.2.0 Release 1999); ETSI TS 123.057", ETSI Standards, vol. 3-T2, No. V3.2.0, Jun. 1, 2000, 62 pages.

SYNCML Consortium: "SyncML Sync Protocol, Version 1.0", Dec. 7, 2000, retrieved from the Internet at <http://www.syncml.org/docs/syncml_protocol_v10_20001207.pdf>, 60 pages.

Jonsson, et al., "SYNCML—Getting the Mobile Internet In Sync", Jan. 1, 2001, pp. 110-115.

"WAG UAProf Version Oct. 20, 2001", Internet Citation Oct. 20, 2001, retrieved from the Internet on Oct. 16, 2003 at <http://www.wapforum.org>, 86 pages.

* cited by examiner

APPARATUS, AND ASSOCIATED METHOD, FOR RETRIEVING MOBILE-NODE LOGIC TREE INFORMATION

CROSS-REFERENCE TO RELATED APPLICATIONS

The present invention claims the priority of provisional patent application Ser. No. 60/336,879, filed on Dec. 3, 2001, provisional patent application Ser. No. 60/350,669 filed Jan. 22, 2002, and provisional application Ser. No. 60/384,517, filed on May 30, 2002.

The present invention relates generally to a network having a mobile node of a dynamically-alterable configuration, configurable at the mobile node, independent of a network manager. More particularly, the present invention relates to apparatus, and an associated method, by which to facilitate retrieval by, or other exchange to, the network manager of selected capability indicia representative of selected portions of the mobile-node configuration, or capability. Selected information related to a logic tree of the mobile node is retrieved from the mobile node and provided to the network manager. The information is retrieved either by request of the network or upon initiation by the mobile node. The information is provided to the network manager, efficiently, with reduced signaling overhead relative to existing manners by which information is conventionally provided to the network manager.

BACKGROUND OF THE INVENTION

Advancements in communication technologies have permitted the development and installation of many various types of communication systems. Wireless communication systems are exemplary of communication systems that have benefited from the advancements in communication technologies.

In a wireless communication system, a radio link forms at least a portion of a communication path upon which communication signals are transmitted. A wireless communication system can be implemented as a mobile communication system as the radio link is substituted for a conventional wireline, otherwise required to complete the communication path upon which the communication signals are transmitted. And, when implemented as a mobile communication system, increased mobility of communication is, as a result, provided.

Network infrastructures of various types of wireless communication systems have, for instance, been installed throughout significant geographical areas. The network infrastructures of cellular communication systems, have been installed, available for usage by large numbers of subscribers to communicate therethrough. Access to communicate by way of a cellular communication system is typically provided pursuant to purchase of a service subscription. In a cellular communication system, telephonic communication of both voice and data is provided pursuant to the service subscription.

In a conventional, cellular communication system, a subscriber thereto typically utilizes a mobile terminal that is formed of a radio transceiver. A radio transceiver is capable both of transmitting and of receiving radio signals communicated upon radio links formed between the mobile terminal and the network infrastructure of the communication system. The term user shall be used herein, generally to identify one utilizing the mobile terminal to communicate therethrough.

Increasingly, cellular communication systems are constructed to make use of digital communication techniques in which data that is to be communicated during operation of the communication system is communicated in digitized form. Processing circuitry is utilized to act upon the data, prior to its transmission as well as, also, subsequent to its reception.

A mobile terminal regularly is packaged in a housing of dimensions to permit the mobile terminal to be carried by the user. Various constructions of mobile terminals are of physical dimensions permitting the user thereof to carry the mobile terminal in a shirt pocket, or the like, conveniently to have the mobile terminal available at any time to place or to receive a call therethrough.

Because the mobile terminal utilizes processing circuitry, additional functions, in addition to the functions required to effectuate conventional communication operations, can be carried out by the mobile terminal. That is to say, the functionality of other types of devices can be incorporated into the mobile terminal. Information processing, and retrieval, functions are sometimes incorporated into a mobile terminal. And, mobile terminals are increasingly constructed to provide for multi-media communication services. Digital-video devices, such as digital cameras, are sometimes now incorporated with a mobile terminal by which to collect digital data that subsequently is communicated by the transceiver circuitry of the mobile terminal.

The mobile terminal might well be adapted, subsequent to its initial manufacture or initial association with a cellular communication system to provide for other functionalities or otherwise to have its operational parameters changed. The alteration, adaptation, update of, or other change to the functionality of the mobile terminal might well be made independent of a network manager of the communication network in which the mobile terminal is operable. Network management of the mobile terminal, forming a mobile node in such a network, might not be able to be effectuated as a result of such alterations or changes.

The functionality of many mobile terminals, as well as other devices, are defined in terms of a management tree. The management tree is formed using one or more DDF (Device Description Framework) description of objects. Each DDF description is a logical grouping of related objects, all described in the same document. A tree is constructed, or initiated, using one or more of such DDF descriptions. Thus, all objects instantiated in a management tree comes from one of the DDF documents. And, while the DDF document for objects is common to all devices, the management tree need not be the same for all of the devices. As noted above, a digital camera, for example, might be added to the mobile node. The DDF for enabling a camera attachment to the mobile node might well be the same for mobile nodes of the same make. But, when the tree based on this DDF is created in each mobile node, it can get created at different locations in the management tree.

A network manager conventionally is able to obtain information associated with the management tree and, responsive thereto, to exert managerial control over the node. Existing management protocols are available by which to support the retrieval of the value, or attributes, of individual ones of the objects that define the management tree.

Existing communication protocols, such as SNMPv2, support a get-bulk message, for instance. A get-bulk message requests that the value of a collection of objects requested in the message, and a response thereto carries the values of each object in the same response message. And, a prior version of SNMP provided for get messages for individual objects, necessitating several get messages to obtain the same information retrieved by a get-bulk message. SNMP, however, requires that prior knowledge be known by the requestor of the management tree structure of the device from which the information is requested. When a device is of a configuration that is alterable relative to an initial configuration, the necessary information cannot necessarily be retrieved through the use of SNMP protocols.

Another device management protocol is SYNC ML DM1.1 or a variant thereof, such as an updated version, i.e., SYNC ML DM1.1.1, or a subsequent revision thereof. An existing version of this protocol, however, supports only a get message procedure for retrieving the value of an object. To retrieve a collection of objects, this protocol requires several get messages, or a single get message listing all of the objects for which the information is requested. When the node with which the network manager is associated is a mobile node, such as a mobile terminal together with additional functionality, the need to send a plurality of get messages over a radio link extending to the mobile node, and the corresponding response messages generated responsive thereto, inefficiently utilizes the band width capacity of the radio link. And, a large get message, listing all of the required objects for which information is requested, also is inefficient as the message-size increases proportional with the number of objects for which information is requested.

Accordingly, existing protocols are inadequate for use by a network manager in conjunction with a dynamically-configurable mobile node. Any manner by which to provide a more efficient mechanism by which to facilitate retrieval or other exchange of tree information from a mobile node to permit a network manager to effectuate network management operations would be advantageous.

It is in light of this background information related to communications with a mobile node of a communication network that the significant improvements of the present invention have evolved.

SUMMARY OF THE INVENTION

The present invention, accordingly, advantageously provides apparatus, and an associated method, for a network having a mobile node, of a dynamically-alterable configuration, configurable at the mobile node, independent of a network manager.

Through operation of an embodiment of the present invention, a manner is provided by which to facilitate retrieval by or other exchange to, the network manager, of selected capability indicia representative of selected portions of the mobile-node configuration, or capability.

In one aspect of the present invention, selected information related to a large tree of the mobile node is retrieved from the mobile node and provided to the network manager. The information is retrieved either by request of the network or upon initiation by the mobile node.

The information is provided to the network manager, efficiently, and with reduced signaling overhead relative to existing manners by which the information is retrieved.

In another aspect of the present invention, a network-positioned request generator operates to generate a request message. The request message forms a get command that includes fields identifying a portion of the logic structure of the mobile node of which information is to be requested. And, the request message further indicates a degree of detail by which the requested information is to be delivered to the network manager.

In another aspect of the present invention, the functionality of the mobile node is defined in terms of objects that are arranged in a logic tree structure. The logic tree structure typically includes subtrees. The logic tree is formed using one or more DDF (device, description, framework) description. A DDF is a document that describes objects. And, each subtree, if any, can be formed of one or more DDF descriptions Or, for a given subtree, its DDF can be created. Because the configuration of the logic tree, and the subtrees, or subroots thereof, are dynamically alterable, without the interaction of the network manager, the tree structure of the mobile node is not necessarily known by the network manager. Further, the semantic meaning of the objects arranged in the tree structure might also not be known to the network manager. The request message generated by the request message generator of the network part identifies the object ID (identification) of the subtree. Once the request message is delivered to the mobile node, the mobile node determines the logical location of the object ID and then retrieves the requested information at the desired degree, or level, of detail. When returned to the network manager, such information is used by the network manager to effectuate managerial control over the mobile node.

In another aspect of the present invention, the get message further includes a list of attributes, information related to which is to be requested pursuant to the generation of the get message. The list of attributes include, for instance, a value, a version number, or a description of an object described by the DDF description of the subtree. Thereby, such a message need only identify, e.g., by name or location or structure, and the attributes associated therewith, an object to permit the mobile node to retrieve such information and return the information to the network manager to permit the network manager to utilize such information thereafter to exert managerial control over the mobile node.

In another aspect of the present invention, when the mobile node retrieves the information contained in the get, or other request, message, the mobile node selectably performs tree compression algorithms to compress the tree, or subtree, information. For instance, tree linearization operations are performed to convert a multi-way tree into a binary tree. And, responsive to the desired degree of detail indicated in the request message sent to the mobile node, the requested tree information is returned to the network manager at the desired level of detail.

In one implementation, a mobile node is operable to communicate in a cellular communication system constructed in conformance with a CDMA (code-division, multiple, access) operating specification. In other implementations, the mobile node is operable to communicate pursuant to a UMTS (Universal Mobile Telephone Service), or other, mobile air interface standard. The mobile node forms a portion of a network that is managed by a network manager. The mobile node is dynamically configurable and also dynamically positionable in successive networks, all in manners such that the network manager is not necessarily aware initially of the configuration of the logic tree of the mobile node. The network manager generates a request message, a get message, for communication to the mobile node. The get message includes an object identifier, indicating the identity by name, location, or structure of an object of interest together with a list of attributes of such object about which information is desired. The message is communicated to the mobile node. When the mobile node detects delivery thereat of the request message, the mobile node retrieves the desired information and generates a result message that is returned to the network manager. The network manager is able thereafter to manage better operations of the mobile node as the logical structure of the mobile node is known to the network manager.

In these and other aspects, therefore, apparatus, and an associated method, is provided for a radio communication system at which a communication network is defined. The communication network has a mobile node forming a portion thereof. The communication network is managed by a network manager. Retrieval by the network manager of capability indicia of the mobile node is facilitated. The capability indicia is representative of a dynamically alterable mobile node capability related to objects maintained thereat. The mobile node capability is alterable independent of the network manager. A network-positioned request generator is operated by the network manager. The network-positioned request generator generates a request message for communication to the mobile node. The request message requests the capability indicia related to a selected set of the objects maintained at the mobile node and requests the capability indicia to be provided at a selected level of detail.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
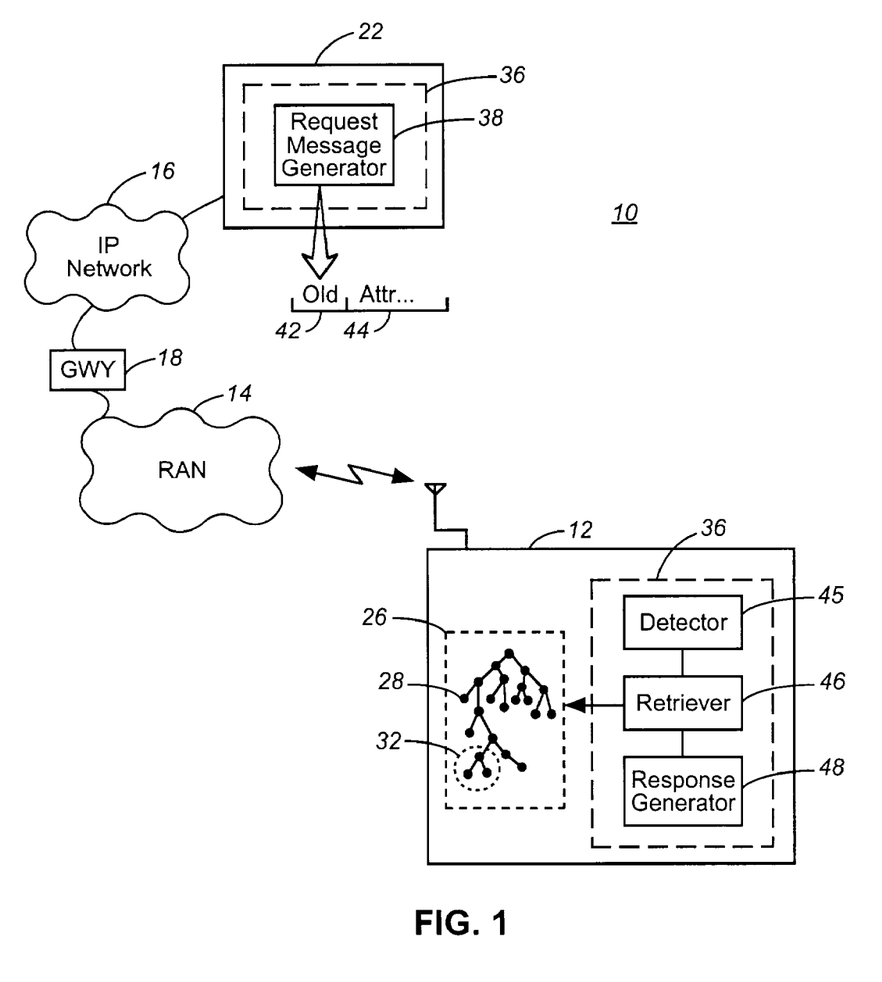
FIG. 1 illustrates a functional block diagram of a radio communication system in which an embodiment of the present invention is operable.

Referring first to FIG. 1, a radio communication system, shown generally at 10, provides for radio communications with a mobile node 12. In the exemplary implementation, the radio communication system forms a multiple-access communication system permitting large numbers of mobile nodes to communicate therewith, such as a CDMA (code-division, multiple-access) cellular communication system that here provides for packet-based communications. While the following description shall describe exemplary implementation of an embodiment of the present invention with respect to a cellular communication system, the communication system 10 is also representative of any of various other types of radio communication systems. Accordingly, while the following description shall describe exemplary operation of an embodiment of the present invention with respect to its implementation in a cellular communication system, the teachings of the present invention are analogously also implementable in other types of communication systems.

The communication system includes a network, here formed of a radio access network 14 and a packet data network, here an IP network 16. The radio access network and the IP network are interconnected by way of a gateway (GWY) 18. And, here, a device management (DM) server 22 is coupled to the IP network. The DM server forms a network manager for managing a network of which the mobile node 12 selectably forms a portion. The network managed by the IP network manager formed of the DM server 22 forms, for instance, a virtual private network (VPN).

The mobile node is represented functionally by a tree 26 of objects 28. The logic tree is here formed of groups of subtrees, of which the subtree 32 is representative. The subtree 32 is formed of at least two nodes. The logic tree, or any subtree thereof, is formed using one or more DDF description of objects. The logic tree is sometimes also referred to as a root directory, and a subtree thereof is sometimes referred to as being a subroot of the root directory. And, some of the objects are defined to be leaf objects that carry values. Such values are sometimes also referred to as being interior objects, or nodes.

The mobile node is configurable, or reconfigurable, independent of the network manager of the network of which the mobile node selectably forms a portion. Configuration or reconfiguration of the mobile node affects the logic tree 26 thereof. That is to say, the arrangement of, and the DDF description of objects contained in, the logic tree of the mobile node are dynamically alterable, independent of the network manager of the network of which the mobile nodes selectably forms a portion. To properly effectuate managerial control over the mobile node, the network manager of the network of which the mobile node forms a portion, the network manager must be able to ascertain indicia associated with the logic tree, or portions thereof, of the mobile node. Existing manners by which the network manager obtains the indicia associated with the objects of a node, such as in a conventional wired network, create an excessive amount of signaling overhead when used in conjunction with a mobile node necessitating a connection by way of a radio link.

In one implementation, the desired logic tree information is obtained upon request of the network. In another implementation the information is provided upon initiation by the mobile node. The server 22 forming the network manager includes apparatus 36 of an embodiment of the present invention. The apparatus 36 includes a request message generator 38 that operates to generate a get message to request indicia associated with selected objects, subtrees, or other portions of the logic tree defined at the mobile node. The signaling overhead associated with the request message, and retrieval of indicia responsive thereto, is reduced relative to existing manners by which such indicia is obtainable by a network manager. The need otherwise to utilize a conventional get-bulk message or utilize a new-protocol message is obviated. Through generation of the get message by the request message generator, the signaling overhead on the radio link is reduced relative to conventional generation of get messages that necessitate a separate get message for each object of the mobile node or a get bulk message to retrieve indicia associated with every object of the logic tree of the mobile node. The request message generator generates a get, i.e. request, message, formatted to include the object identity (OID) 42 followed by a string, or list, of attributes (ATTR) 44. Once generated and formatted, by a formatter, into the form indicated in the figure, the message is routed through the network part of the communication system and sent by way of the radio link to the mobile node.

Once delivered to the mobile node, additional apparatus 36 of an embodiment of the present invention is positioned to detect, by way of a detector 45, the get message sent thereto. The apparatus 36 further includes a retriever 46 operable responsive to detection by the detector 44. The retriever operates to retrieve the indicia contained in the get message. That is to say, the attributes associated with the selected objects are retrieved. The listing of attributes also define the level of detail by which the indicia associated with the selected objects are to be retrieved.

The apparatus 36 also includes a response generator 48 for generating a response containing the information retrieved by the retriever. The response generator includes a formatter for formatting the response generated by the generator in a desired format, such as an SYNC format. The response is returned by the mobile node to the network manager. When received at the network manager, the network manager is provided with the indicia to permit the network manager better to effectuate control over the mobile node. Updated information associated with the logic tree 26 of the mobile node is thereby provided to the network manager.

The objects are identifiable, for instance, in terms of their respective URL or URI values.

In an alternate implementation, the mobile node operates to notify the network manager of changes to the logic tree structure of the mobile node upon effectuation of such changes to the logic tree. A get message need not be sent to the mobile node to initiate generation of such a message. Automatic message generation and transmission is performed, for instance, immediately subsequent to the creation of new objects at the beginning of a mobile-node-initiated management session. As changes can occur independent of the management server, the mobile node is in a position to know about these changes and inform the management server of these changes and also where the changed tree can be retrieved from a network location, e.g., from the entity making these changes in the mobile node. Or, the mobile node may send the modified tree directly to the management server. In the latter case, the changes, including the tree structure are sent. This is implementable in various manners. For example, in one implementation, a trigger is generated in the mobile node after the tree changes in the mobile node. Or, the mobile node is programmed to automatically send the tree, or the location where the tree can be retrieved in the network, to the management server in a visited network when roaming. This, e.g., can be part of the business model where an agreement exists between a home network and a visited network to permit continuous management of a mobile node. Also, it can be programmed in the mobile node to send merely changes in desired subtrees. It is also possible to send the semantic meaning or reference of objects to the management server. This can be a reference to a well-defined standard. For example, the object called 'PRL' can be reference to a section in a CDMA standard. And, there can be more than one management server managing a given mobile node. For example, the CDMA management server for CDMA radio access management is formed of any of various application management servers are available for managing respective applications, corporate management servers for corporate mobile nodes, etc. In each case, only subtrees relevant to each management server are updated by the mobile node, either following a request or automatically by the mobile node.

FIG. 2 again illustrates the communication system 10. Again, the mobile node 12 operates to communicate by way of a radio link with a network part of the communication system, formed of a radio access network 14 and an IP network 16, connected theretogether by way of a gateway 18. Here, the communication system further includes object servers 58 and 62. The object servers are connected to the IP network and each of the servers 58 and 62 are separately operable to add to the logic tree or otherwise change the configuration of the tree structure of the mobile node. That is, the servers 58 and 62 may add objects for storing the URL or URI of the locations where the respective parts of the logic tree 26, updated by the servers, is stored in the network. A management server 22 thereafter is able to use a management protocol message to obtain the values of the location objects, i.e., the URI values, and use the URI values to retrieve the management tree from the network. In this manner, radio link communications are obviated.

Figure 2:
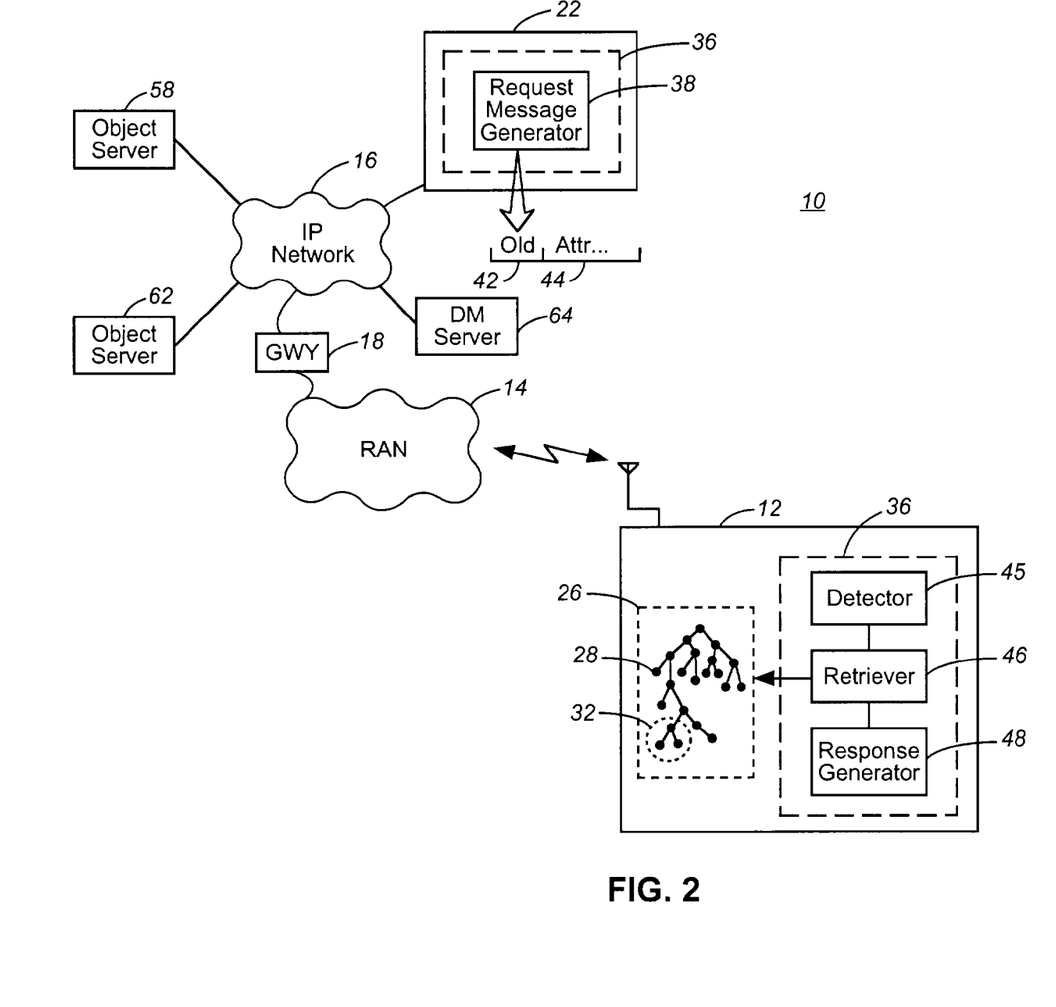
FIG. 2 illustrates a functional block diagram, similar to that shown in FIG. 1, but here representative of a change in the network manager that manages operation of the mobile node from a network manager positioned at a first network server to a network manager positioned at a second network server.

Alternately, and as described hereinabove, the network manager obtains the location from the mobile node, and the mobile node sends the location in a management protocol message upon changes in the logic tree, such as through additions of new objects at the mobile node, or other changes in the configuration thereof. Again, the sending of the management protocol message is, for instance, generated immediately after creation of the new objects, or other reconfiguration of the logic tree of the mobile node at the beginning of a client-initiated management session.

FIG. 2 further illustrates a second device management server 64. A second network manager, associated with a second network is embodied at the DM server 64. The mobile node is capable of changing networks with which the mobile node is associated. And, here, the second network manager embodied at the DM server 64 is representative of the network manager of the second network to which the mobile node selectably becomes associated. And, when the mobile node changes networks, the new network manager, i.e., the new management server formed of the DM server 64, should be updated with the relevant part of the logic tree 26 of the mobile node.

In one implementation, the mobile node sends the relevant part of the logic tree to the network manager embodied at the DM server 64. The mobile node sends indicia of the relevant part of the tree, for instance, immediately upon boot strapping into the network, in the beginning of a session. Or, the indicia identifying the logic tree is sent as a response to a get message generated by the second network manager.

In another implementation, after initial boot strap, operations are performed between the mobile node and the second network manager, the mobile node sends to the DM server 64 at which the second network manager is embodied, the URI to the location at which the logic tree of the mobile node is stored. The network manager subsequently utilizes the URI to retrieve the relevant part of the management tree. In the figure, a server 68 stores values representative of the logic tree of the mobile node. The server 68 is identified by a URI. The mobile node sends the URI, as just-described, to the second network manager. And, the second network manager accesses the server 68 to retrieve the desired information, as indicated in a message request.

Figure 3:
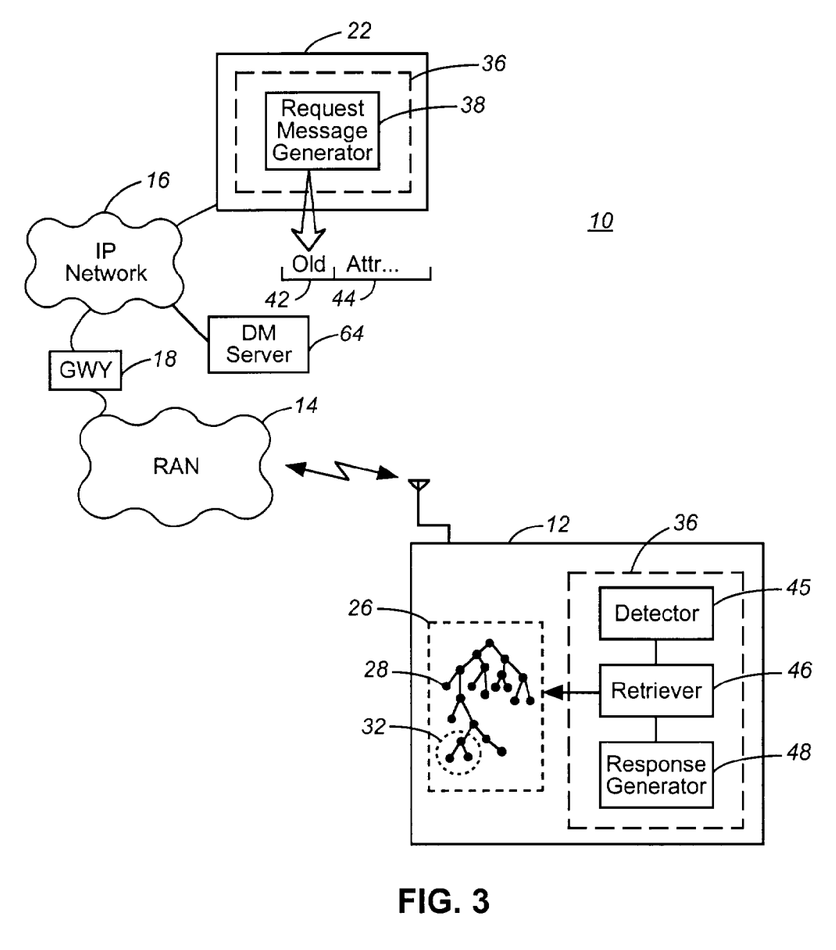
FIG. 3 illustrates a functional block diagram, similar to those shown in FIGS. 1 and 2, but here representative of operation in which multiple, hereto, network managers.

FIG. 3 again illustrates the communication system 10 in which a mobile node 12 communicates by way of a network part formed of a radio access network 14 and the IP network 16. Again, DM servers 22 and 64 are connected to the IP network, and each of the servers have, embodied thereat, network managers that manage separate networks. Here, the mobile node is managed by the network managers embodied at each of the servers 22 and 64. Here, the network manager embodied at the server 22 manages a first part of the logic tree 26 of the mobile node, and the network manager embodied at the second server 64 manages a separate part of the logic tree of the mobile node. In this type of operation, the network managers each are separately operable to generate get messages, as described herein. But, as only portions of the logic tree are of interest to each of the network managers, the individual network managers request information associated only with the portions of the logic tree relative to the respective network managers.

FIG. 4 again illustrates a representation of the communication system 10 in which the mobile node 12 communicates by way of a network part including a radio access network 14 and an IP network 16 connected together by way of the gateway 18. Here, the mobile node 12 roams between an initial position and a subsequent position. Here, the radio access network is identified by a first radio access network 14-1 and a second radio access network 14-2. And, a gateway (GWY) 18-1 interconnects the first radio access network with the IP network, and a second gateway (GWY) 18-2 interconnects the second radio access network with the IP network. Here, the first DM server 22 at which the first network manager is embodied is representative of a network manager of a home network with which the mobile node is selectably operable. And, the second DM server 64 at which the second network manager is embodied is representative of a visited-network, network manager.

Figure 4:
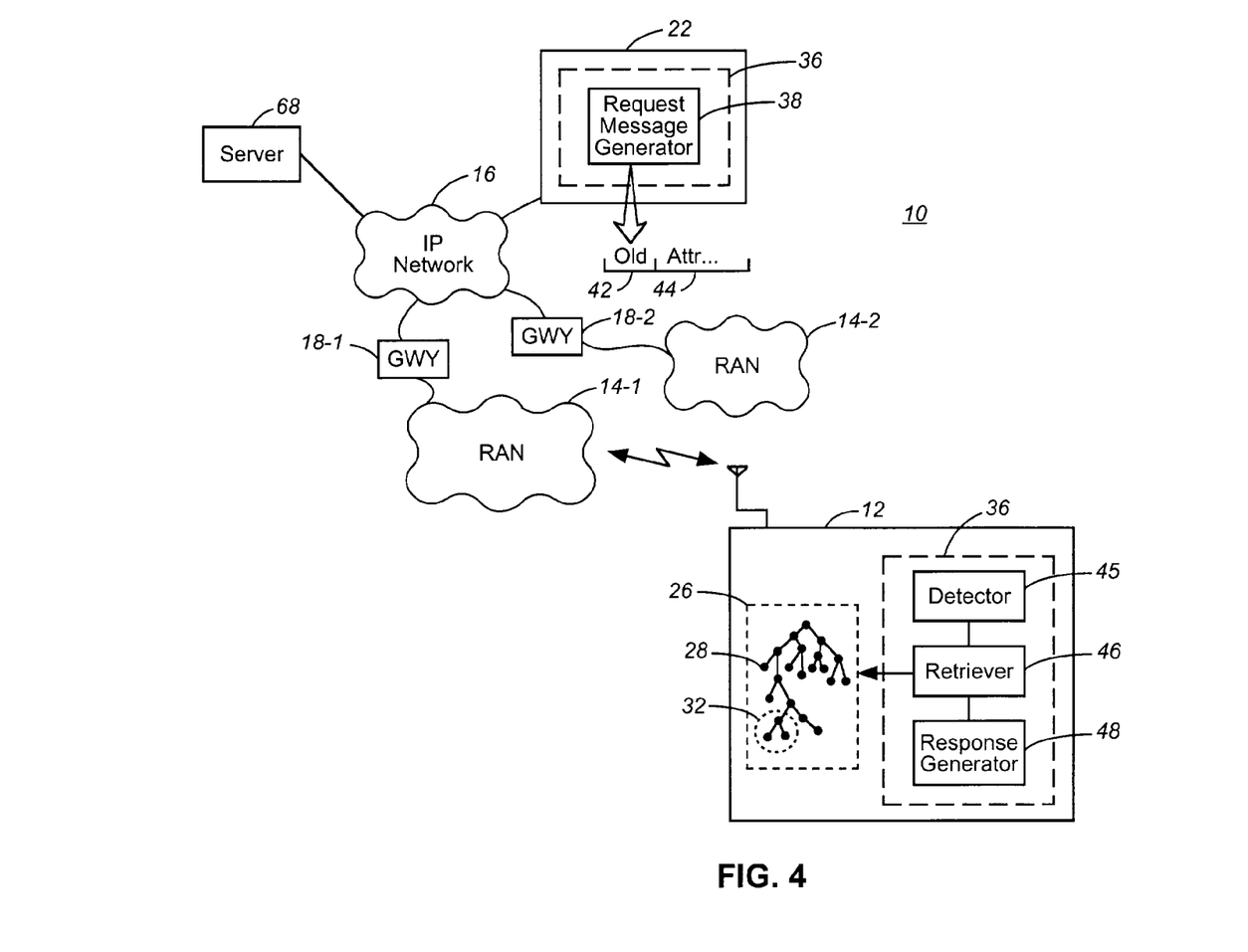
FIG. 4 illustrates a functional block diagram, similar to those shown in FIGS. 1-3, but here representative of a scenario in which the mobile node roams out of a first network and into a second network.

Upon repositioning of the mobile node with the visited network, the mobile node sends the URI of a location, here the server 68, at which a management tree associated with the logic structure of the mobile node is stored. The network manager of the visited network thereafter accesses the server 68 to obtain desired information associated with the logic structure of the mobile node.

In an alternate implementation, subsequent to initial boot strap operations with the mobile node, the network manager of the visited network can request the URI by sending a management protocol message to the mobile node. And, the mobile node replies to the management protocol message with the identity of the URI.

Figure 5:
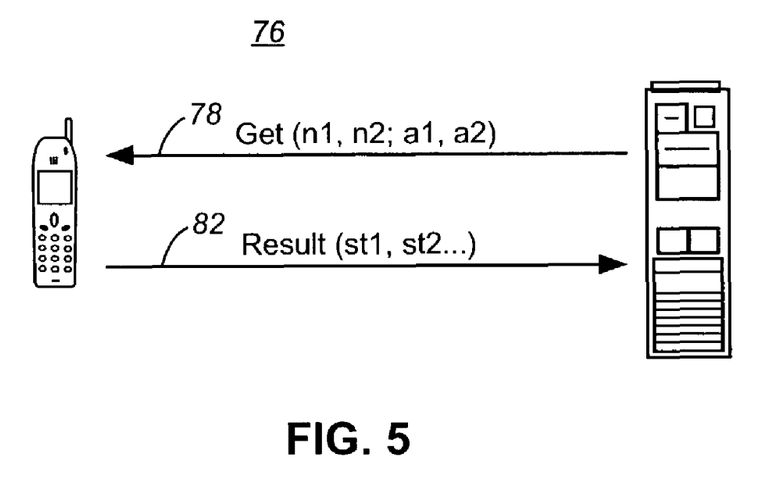
FIG. 5 illustrates a message sequence diagram showing signaling generated during operation of an embodiment of the present invention.

FIG. 5 illustrates a message sequence diagram, shown generally at 76, of signaling generated during operation of the communication system 10. Here, the network manager embodied at the DM server 22 generates a get message, indicated by the segment 78, and sends the get message to the mobile node. Here, the get message includes the URIs of subtree nodes and attribute sets for each node for which information is requested. When the message is delivered to the mobile node, the mobile node traverses each node indicated in the get message and represents the subtree represented by such nodes starting at each node in a form that manner permitting a response to be formed. A result message is generated, here indicated by the segment 82, that is returned to the network manager. The values contained in the result contain indicia associated with the attributes of the nodes indicated in the get message. Attributes can, for instance, be algorithms used for encoding and compressing the subtree object, size of the subtree object, etc.

The mobile node is capable of dynamically forming a representation of the requested collection of subtrees, then encode and depress the dynamically-formed data, so that the final data is sent as a response to the get message. Standard algorithms for encoding and compressing the logic trees and data associated with the logic trees can be utilized. The mobile node is further selectably operable to place the encoded and compressed data as an object in the management tree. Such creation of the object is performed dynamically. Additionally, attributes such as names of algorithms used for tree compression and encoding, the size of data, and other attributes can also be associated with objects of the logic tree. And, the mobile node also is capable of sending the address of the location in the logic tree at which the data object is stored. The mobile node is also capable of sending the attributes of the object, if requested. The address is, for instance, the URI of the location of the object in the tree. Generally, a request containing the URI of all required objects is not efficient as it can be a large message. On the other hand, just one URI representing the subtree can be used in the request As a result all of the objects are returned at the selected level of detail.

Figure 6:
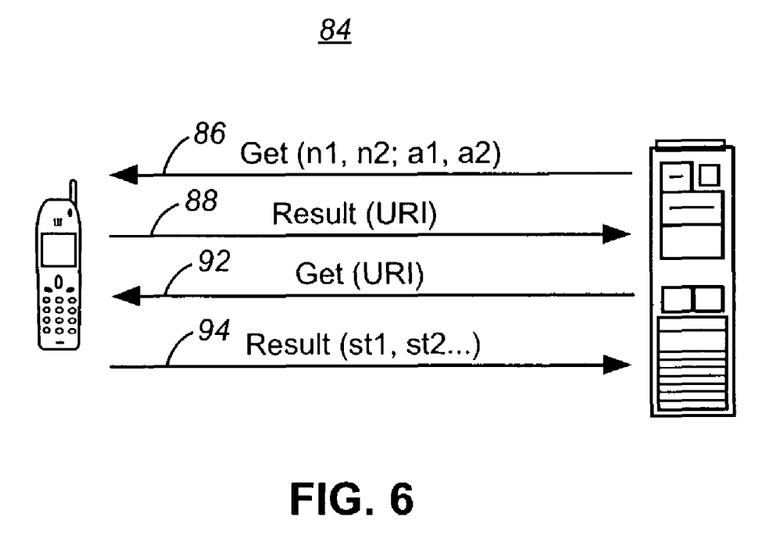
FIG. 6 illustrates a message sequence diagram showing signaling generated during operation of another embodiment of the present invention.

FIG. 6 illustrates a message sequence diagram, shown generally at 84, also representative of signaling generated during operation of an embodiment of the present invention. Here, the network manager 22 generates get messages for communication to the mobile node. And, the mobile node generates responses thereto. Here, a get message, indicated by the segment 86, is generated. The get message includes the URIs of subtree nodes and attributes sets for each node in the list. Here, the indication a1 is a set of attributes for the node n1, and the attribute a2 is a set of attributes for the node n2.

Upon delivery of the get message to the mobile node, the mobile node traverses each node contained in the get message and represents the subtree starting at each node in a form that can be sent in a response message, here indicated by the result (URI) message 88. Additional get and result messages formatted in other manners, are indicated by the segments 92 and 94.

The mobile node is capable of splitting a data object into multiple units, and store the multiple units as individual objects in the management tree of the mobile node. The splitting is based upon a maximum size allowed in a response message sent by the mobile node to the network manager. These objects can be grouped under the same parent node in the mobile node. The attribute in this scenario can also be a sequence number giving the order of splitting the large data object. And, encoded and compressed subtrees can be sent in response to a get message. The subtree, or collection of objects, is represented, for instance, using XML, and then encoded using binary encoding for XML. Also, the data can be compressed using data compression algorithms, thereby to permit compressed data to be sent in response to the get message or put as the value of a dynamically-created node in the management tree of the mobile node. The subtree, or collection of objects, can also be compressed using a tree-compression algorithm. And, the output of the tree-compression algorithm can further be compressed using a data-compression algorithm. The compressed data is sent in the response to the get message generated by the network manager or placed as a value dynamically-created node in the logic tree.

The network manager can also utilize an SNMP or SYNC ML get message, depending upon the preferred device-management protocol. Other management protocols are similarly utilizable.

Figure 7:
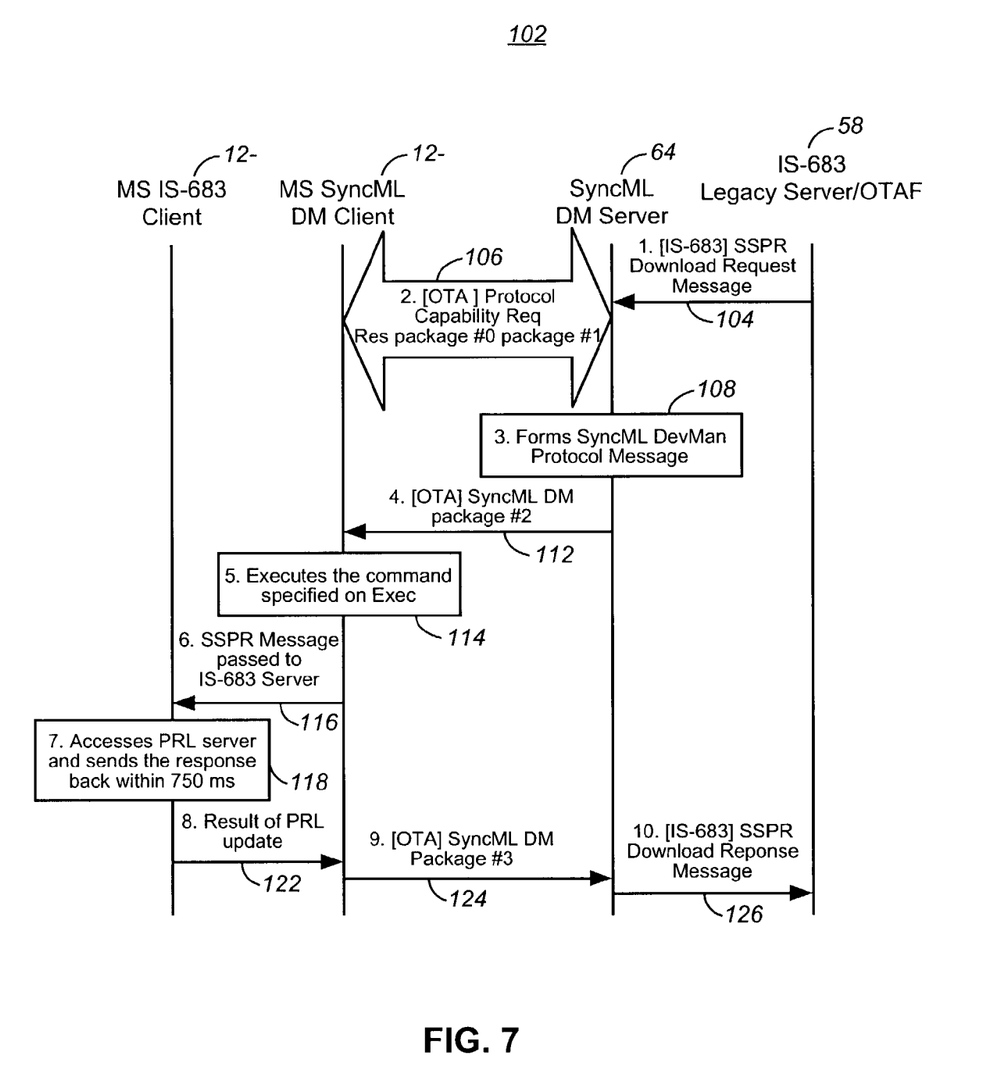
FIG. 7 illustrates a message sequence diagram showing signaling generated during operation of a further embodiment of the present invention.

FIG. 7 illustrates a message sequence diagram, shown generally at 102, representative of signaling generated during operation of a further embodiment of the present invention. Here, Sync ML (Sync MarkUp Language) protocols are used in the communication system. And, the mobile node is here shown to be formed of a mobile-station, Sync ML DM (Device Management) Client device 12-1 and a legacy-standard client device 12-2. The legacy-standard client device is here operable pursuant to the operating protocols of the IS-683 (Interim Standard-683) promulgated by the TIA/EIA (Telecommunications Industry Alliance/Electronics Industry Alliance. The IS-683 standard pertains to a CDMA (code-division, multiple-access) system.

In this embodiment, device management capabilities, e.g., the protocols used by, and capabilities of, the mobile node are negotiated by way of the radio link formed with the network. And, the network is here shown to include a legacy server/

OTAF (over the air function) 58 and Sync ML DM server 64-1. Here, the legacy server/OTAF 58 is an IS-683 compliant device.

IS-683 devices are limited to signaling protocol and management features that are specified in the IS-683 operating specification. And, some carriers, i.e., system operators of radio communication systems, implement IS-683 standards for device management. But, carriers also sometimes want a method for managing devices in such systems through the use of Sync ML signaling. Flexibility of adding new management features, amongst other advantages, are provided through the use of Sync ML signaling.

Through operation of a further embodiment of the present invention, a manner is provided by which to send Device Information (DevInfo) for management of CDMA devices, here, e.g., the mobile node 12. And, through such operation, a manner is provided to the server 58 by which to identify the preferred protocol to effectuate the management of a CDMA device, identify the management capabilities of the device, and also uniquely identify the device for device management purposes. That is to say, operation of this further embodiment of the present invention, e.g., assists the DM server 64 to learn of the process/server at the mobile node 12 that handles a specific management request in a dynamic way. And, e.g., operation of the embodiment of the present invention permits the SyncML DM protocol to have backwards compatibility with a legacy, over-the-air function (OTAF), such as the IS-683 standard. This assists carriers who currently otherwise make use of IS-683 protocols to integrate their respective device management systems with the SyncML DM system. Also, e.g., through operation of this further embodiment of the present invention, a CDMA device is uniquely identified for device management purposes. And, e.g., operation of this embodiment of the present invention facilitates the SyncML DM server 64 to perform device management using the protocol of preference of the mobile node.

The device information (DevInfo) is here bearer specific information that is sent by the mobile node 12 to the management server 58. Such bearer specific device information facilitates the ability of the server to be aware of the features and protocols that are supported for managing bearer-dependent features.

While the signaling indicated in the message sequence diagram is representative of signaling generated in a CDMA system, the operation is analogously applicable to other types of communication systems in which Sync ML protocols are used in conjunction with legacy-system devices. Analogous description of operation can also, accordingly, be described with respect to other types of communication systems. And, while this description of exemplary signaling illustrates a manner by which CDMA DevInfo is used to identify the process/server at the mobile node 12 that handles a specific management task, as well as how the CDMA DevInfo is used to facilitate backward compatibility with legacy-system devices, analogous operation can be described with respect to signaling generated to effectuate other tasks.

During operation of this embodiment of the present invention, each of the EIA/TIA-683 requests and responses, formed by the legacy server/OTAF 58 and the client device 12-2 is sent over Sync ML DM protocol messages. And, more particularly, here, the Sync ML Exec command is used to specify the process in the client device 122 that is to be invoked for a specific TIA/EIA-683 request. The signaling shown in the message sequence diagram 102 is representative of signaling that effectuates a TIA/EIA-683 SSPR update using a Sync ML-based DM protocol. Analogous procedures are carried out to effectuate other TIA/EIA-683 message generations.

First, and as indicated by the segment 104, the legacy server/OTAF 58 generates an SSPR download request message for delivery to the mobile node 12. The format of the SSPR message is conventional, and the types of PRL-related data that is permitted to populate the data field of such a message is set forth, e.g., in Section 4.5.1.9 of the IS-683 standard, promulgated by the TIA/EIA.

A protocol capability request message is also generated. That is, the TIA/EIA-683683, legacy server/OTAF sends, indicated within the signaling represented by the arrow 106, a protocol capability message over a Sync ML DM protocol message. The message is here indicated to be package number zero. Subsequent to delivery of the message to the mobile node, the Sync ML DevMan client at the mobile node sends a protocol capability response to the DevMan server 64. The response is indicated to be package number one in the signaling represented by the arrow 106. The response indicates whether the DevMan-capable mobile node supports legacy TIA/EIA-683 OTASP/OTAPA (over the air service provisioning/over the air parameter administration) formatted communications.

In an alternate implementation, a database is maintained at the DM server 64. The database contains information regarding the protocol capability of each Sync ML DM-capable mobile node, such as the mobile node 12. Generation of the SSPR download request message is obviated as the contents of the database are instead accessed.

And, in another alternative embodiment, if the protocol capability parameters are included in DevInfo, and the DevInfo is sent to the Sync ML DM server as part of the package number one before every Device Management session, the need otherwise to generate the SSPR download request message is analogously also obviated.

If the device supports the TIA/EIA-683 OTASP/OTAPA-formatted communications, the Sync ML DM server 64 intercepts the SSPR download request message, indicated by the segment 104, and the message is encapsulated into a Sync ML protocol message. The encapsulation is performed, as indicated by the block without changing the format of the SSPR request. And, the Exec command in the Sync ML message points to the server in the mobile node 12 that is to be invoked for handling the SSPR download request message. And, the name of the server is, e.g., specified in the Target element. One manner by which the name of the process or server at the mobile node that handles the TIA/EIA-683 messages is provided to the DM server is pursuant to the signaling represented by the arrow 106. That is, during the protocol negotiation phase, the mobile node sends a list of data pairs to the Sync ML as part of the package number one of the response indicated as part of the signaling represented by the arrow 106. The data pairs indicate service names paired together with names of servers handling a service.

The Sync ML DM server 64 sends, as indicated by the segment 112, the message formed thereat, over the air (OTA), to the mobile node 12 as part of a Sync ML DM package, here identified as package number two. The message is sent, for instance, over a TCP (transport control protocol) transport layer or another selected transport mechanism that is supported by Sync ML. The Sync ML protocol message includes an Exec statement that points to the process to be invoked to process the SSPR download request message. The message is delivered to the Sync ML DM client device 12-1. When the Exec command is executed, as indicated by the block 114, the Sync ML DM client device passes the encapsulated SSPR message, as indicated by the segment 116, to the client device 12-2.

The client device 12-2 invokes, as indicated by the block 118, the PRL server to complete a PRL update in a semi-permanent memory of the device. And, subsequent to completion of the update, the client device 12-2 forms an SSPR download response message and provides, as indicated by the segment 122, the message to the client device 12-1. The format of the SSPR download response message is conventional, and details of the format are set forth, e.g., in section 3.5.1.9 of the TIA/EIA-683 standard. If the PRL update is not successfully completed, the SSPR response message includes an appropriate error code to indicate such failure. The error code is set forth, e.g., in Section 3.5.1.2-1 of the IS-683 operational specification.

The Sync ML DM client device 12-1 encapsulates the response message into a Sync ML protocol response message and sends the message, as indicated by the segment 124 over the air to the Sync ML DM server 64, as indicated by the package number three. If errors occur during execution of the exec command, the message also includes, e.g., error codes set forth in the specified Sync ML specification.

And, when the message is delivered to the Sync ML DM server 64, the SSPR download response message is extracted from the encapsulated message. And, the SSPR download response message is forwarded, as indicated by the segment 126, to the legacy server/OTAF 58.

Client-initiated device management can also be performed. When the device management is client-initiated, the DevInfo is sent in package number one, generated during the signaling indicated by the arrow 106, at the beginning of a device management session.

Various parameters are communicated by the client device 12 to the device management server 64 as part of the package number one or the package number three pursuant to over-the-air management of a CDMA mobile node, using Sync ML protocol. These parameters are placed under a DevInfo node of a Sync ML DM management tree maintained at the mobile node.

For instance, an exemplary parameter is the 'ID' (identification) parameter. This parameter is the fixed identifier of the device. E.g., the fixed identifier is formed of a thirty-two bit, electronic serial number (ESN) or the device, or other appropriate identifier, such as a proposed mobile equipment identity (MEID).

Another exemplary parameter is a CDMA_PROT_PREF parameter. This parameter identifies the protocol preference of the mobile node. For instance, the value of the parameter indicates whether the current preference is management using a 3GPP2 C.S0016-A/TIA/EIA-683 messaging over the Sync ML protocol.

A CDMA_PROV_CAP parameter identifies the provisioning capabilities of the mobile node. That is, the value of the parameter indicates whether backward compatibility capabilities are present. The value of the parameter specifies the legacy features that are supported by the mobile node. Details associated with this parameter are found, for instance, in Section 3.5.1.7 of the 3GPP2 C.S0016-A/RIA/EIA-683. Another exemplary parameter is the CDMA_IMSI_M parameter. This parameter forms the IMSI_M value. The IMSI_M is the international mobile subscriber identity that contains a mobile identification number (MIN) as a portion thereof, namely in the lower ten digits thereof. And, another exemplary parameter is the CDM_BAND_MODE_CAP parameter. This parameter is set to values to indicate the band and mode capabilities that are supported by the mobile node. Table 3.5.1.7-2 of the 3GPP2 C.S0016A/TIA/EIA-683B contains additional information related to this parameter.

Thereby, through operation of an embodiment of the present invention, bearer specific device information is provided by the mobile node to a management server to provide the server with information permitting the server to be better aware of the features and protocols that are supported at the mobile node, thereby to permit better management of bearer dependent features.

The previous descriptions are of preferred examples for implementing the invention, and the scope of the invention should not necessarily be limited by this description. The scope of the present invention is defined by the following claims:

We claim:

1. An apparatus comprising:
   a memory configured to maintain information for a mobile node logic tree, said mobile node logic tree information defining mobile node functionality, said mobile node functionality being alterable dynamically and independently of a device management server in a communication network, and
   a processing circuitry configured to
      detect indications of a request for capability indicia, associated with at least one selected set of objects, of the mobile node logic tree, at a selected level of detail, and
      retrieve the capability indicia at the selected level of detail indicated in the request.

2. The apparatus of claim 1, wherein the request for capability indicia comprises a self-generated request formed at the mobile node.

3. The apparatus of claim 2, wherein the processing circuitry is further configured to automatically generate the self-generated request in response to a change in the logic tree objects.

4. The apparatus of claim 2, wherein the processing circuitry is further configured to automatically generate the self-generated request in response to roaming operation of the mobile node.

5. The apparatus of claim 1, wherein the capability indicia comprises a semantic meaning associated with an object, of the logic tree.

6. The apparatus of claim 1, wherein the capability indicia comprises bearer-specific device information associated with the mobile node, and wherein the processing circuitry is configured to retrieve capability indicia that comprise the bearer-specific device information.

7. The apparatus of claim 6, wherein the apparatus supports synchronization markup language protocol and wherein the indications of a request comprise a synchronization markup language formatted message.

8. The apparatus of claim 7, wherein the bearer-specific device information comprises indicia associated with the selected set of objects, the selected set of objects being associated with a specific management task.

9. The apparatus of claim 7, wherein the synchronization markup language formatted message comprises a synchronization markup language Exec command.

10. The apparatus of claim 1, wherein the processing circuitry is further configured to generate a response to the request for capability indicia, the response comprising retrieved values of the capability indicia at the selected level of detail, and
   a radio transceiver is configured to send the generated response to the device management server.

11. The apparatus of claim 10, wherein the processing circuitry is further configured to format the generated response.

12. The apparatus of claim 11, wherein the processing circuitry is further configured to compress the generated response pursuant to a compression scheme.

13. The apparatus of claim 10, wherein the generated response comprises at least one uniform resource identifier of a logic tree object.

14. The apparatus of claim 1, wherein the mobile node logic tree comprises a logic-tree structure having one or more sub-tree structures, and wherein the selected set of logic tree objects comprises at least one sub-tree structure of the one or more sub-tree structures.

15. The apparatus of claim 14, wherein each of the one or more sub-tree structures is defined in terms of a device description framework description of objects and wherein the capability indicia, associated with the selected set of logic tree objects, are related to the device description framework description of objects.

16. The apparatus of claim 1, wherein the request for capability indicia comprises at least one identifier for at least one logic tree object, in the at least one selected set of logic tree objects, and a list of attributes for the at least one identified object.

17. The apparatus of claim 16, wherein said at least one identifier comprises at least one uniform resource identifier of at least one logic tree node.

18. An apparatus comprising:
a processing circuitry configured to
generate a request message, for communication to a remotely located mobile node of a radio communication system, to request capability indicia, associated with at least one selected set of objects of a logic tree corresponding to the mobile node, at a selected level of detail, and
a radio transceiver configured to send the request message to the mobile node, wherein said apparatus operating as a device management server in a communication network; and
wherein logic tree information of the logic tree defines mobile node functionality, said mobile node functionality being alterable dynamically and independently of a device management server in a communication network, the logic tree information including the at least one selected set of objects.

19. The apparatus of claim 18, wherein the requested capability indicia are associated with a first selected set of the logic tree objects at a first selected level of detail and with at least a second selected set of the logic tree objects at a second selected level of detail.

20. The apparatus of claim 19, wherein the logic tree comprises a logic-tree structure having a first sub-tree structure and at least a second sub-tree structure and wherein the generated request message requests the capability indicia associated with the first sub-tree structure and with the second sub-tree structure.

21. The apparatus of claim 18, wherein the request message comprises at least one identifier for at least one logic tree object, in the at least one selected set of logic tree objects, and a list of attributes for the at least one identified logic tree object.

22. The apparatus of claim 21, wherein said at least one identifier comprises at least one uniform resource identifier of at least one logic tree node.

23. A method comprising:
generating a request message, for communication to a remotely located mobile node of a radio communication system, the request message requesting capability indicia associated with at least one selected set of objects of a logic tree corresponding to the mobile node, at a selected level of detail; and
sending the request message to the mobile node;
wherein logic tree information of the logic tree defines mobile node functionality, said mobile node functionality being alterable dynamically and independently of a device management server in a communication network, the logic tree information including the at least one selected set of objects.

24. The method of claim 23 further comprising:
detecting at the mobile node values representative of a selected set of logic tree objects for which the capability indicia is requested.

25. The method of claim 23, wherein the requested capability indicia are associated with a first selected set of the logic tree objects at a first selected level of detail and with at least a second selected set of the logic tree objects at a second selected level of detail.

26. The method of claim 25, wherein the logic tree comprises a logic-tree structure having a first sub-tree structure and at least a second sub-tree structure and wherein generating a request message includes generating a request message requesting the capability indicia associated with the first sub-tree structure and with the second sub-tree structure.

27. The method of claim 23, wherein the request message comprises at least one identifier for at least one logic tree object, in the at least one selected set of logic tree objects, and a list of attributes for the at least one identified logic tree object.

28. The method of claim 27, wherein said at least one identifier comprises at least one uniform resource identifier of at least one logic tree node 29. A method comprising:
detecting indications of a request for capability indicia, associated with at least one selected set of objects of a mobile node logic tree, at a selected level of detail,
retrieving the capability indicia at the selected level of detail indicated in the request, wherein mobile node logic tree information, maintained in the mobile node, defines mobile node functionality, said mobile node functionality being alterable dynamically and independently of a device management server in a communication network.

30. The method of claim 29, further comprising:
generating a response to the request for capability indicia, the response comprising the retrieved capability indicia at the selected level of detail, and
sending the generated response to the device management server.

31. The method of claim 30, further comprising formatting the generated response.

32. The method of claim 31, further comprising compressing the generated response pursuant to a compression scheme.

33. The method of claim 30, wherein the generated response comprises at least one uniform resource identifier of a logic tree object.

34. The method of claim 29, wherein the capability indicia associated with the selected set of logic tree objects is related to a device description framework description of objects in the logic tree.

35. The method of claim 29, wherein the request for capability indicia comprises at least one uniform resource identifier and at least one attribute associated with at least one logic tree object in the at least one selected set of logic tree objects.

36. The method of claim 29, wherein the request for capability indicia comprises a self-generated request formed at the mobile node.

37. The method of claim 36, further comprising automatically generating the self-generated request in response to a change in the logic tree objects.

38. The method of claim 36, further comprising automatically generating the self-generated request in response to roaming operation of the mobile node.

39. The method of claim 29, wherein the capability indicia comprises a semantic meaning associated with an object, of the logic tree.

40. The method of claim 29, wherein the capability indicia comprises bearer-specific device information associated with the mobile node, and further comprising retrieving capability indicia that comprise the bearer-specific device information.

41. The method of claim 40, wherein the detecting indications of a request and the retrieving the capability indicia at the selected level of detail are performed in an apparatus that supports synchronization markup language protocol, and wherein the indications of a request comprise a synchronization markup language formatted message.

42. The method of claim 41, wherein the bearer-specific device information comprises indicia associated with the selected set of objects, the selected set of objects being associated with a specific management task.

43. The method of claim 41, wherein the synchronization markup language formatted message comprises a synchronization markup language Exec command.

44. The method of claim 29, wherein the mobile node logic tree comprises a logic-tree structure having one or more sub-tree structures, and wherein the selected set of logic tree objects comprises at least one sub-tree structure of the one or more sub-tree structures.

45. The method of claim 44, wherein each of the one or more sub-tree structures is defined in terms of a device description framework description of objects and wherein the capability indicia, associated with the selected set of logic tree objects, are related to the device description framework description of objects.

46. The method of claim 29, wherein the request for capability indicia comprises at least one identifier for at least one logic tree object, in the at least one selected set of logic tree objects, and a list of attributes for the at least one identified object.

47. The method of claim 46, wherein said at least one identifier comprises at least one uniform resource identifier of at least one logic tree node.

* * * * *